(12) United States Patent
Nishi et al.

(10) Patent No.: US 6,592,111 B2
(45) Date of Patent: Jul. 15, 2003

(54) FLUID-FILLED ACTIVE VIBRATION DAMPING DEVICE

(75) Inventors: Naoki Nishi, Nagoya (JP); Kazuhiko Kato, Komaki (JP); Hideki Matsuoka, Wako (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/282,857

(22) Filed: Oct. 28, 2002

(65) Prior Publication Data

US 2003/0098533 A1 May 29, 2003

(30) Foreign Application Priority Data

Oct. 29, 2001 (JP) ....................................... 2001-331570

(51) Int. Cl.[7] ............................. F16M 5/00; F16F 13/00
(52) U.S. Cl. ................................................ 267/140.13
(58) Field of Search ....................... 267/140.11, 140.13; 248/562

(56) References Cited

U.S. PATENT DOCUMENTS

| | | | | |
|---|---|---|---|---|
| 5,205,546 A | * | 4/1993 | Schisler et al. | 267/140.13 |
| 5,632,472 A | * | 5/1997 | Kato et al. | 267/140.13 |
| 6,264,181 B1 | * | 7/2001 | Muramatsu et al. | 267/140.14 |
| 6,311,964 B1 | * | 11/2001 | Suzuki | 267/140.13 |
| 2001/0010413 A1 | * | 8/2001 | Takashima et al. | 267/140.13 |
| 2002/0014728 A1 | * | 2/2002 | Takeo et al. | 267/140.11 |

FOREIGN PATENT DOCUMENTS

| JP | A-9-89040 | 3/1997 |
|---|---|---|
| JP | B2-3134799 | 12/2000 |

* cited by examiner

*Primary Examiner*—Christopher P. Schwartz
(74) *Attorney, Agent, or Firm*—Beyer Weaver & Thomas, LLP

(57) ABSTRACT

A fluid-filled active vibration damping device including: a pressure-receiving chamber partially defined by an elastic body; an oscillating fluid chamber partially defined by an oscillating rubber plate on one side thereof; a first orifice passage for a fluid communication between the pressure-receiving and oscillating fluid chamber, which are filled with a non-compressible fluid; and a working air chamber partially defined by the oscillating rubber plate on the other side thereof, to which an air pressure variation is applied to cause an oscillation of the oscillating rubber plate. A ratio V/Q of a passage volume V of the first orifice passage to a unit flow amount Q of the fluid through the first orifice passage caused by the oscillation of the oscillating rubber plate based on the air pressure variation applied to the working air chamber is held within a range of about 1–10.

10 Claims, 4 Drawing Sheets

FLUID-FILLED ACTIVE VIBRATION DAMPING DEVICE

INCORPORATED BY REFERENCE

The disclosure of Japanese Patent Application No. 2001-331570 filed on Oct. 29, 2001 including the specification, drawings and abstract is incorporated herein by reference in its entirety.

BACKGROUND OF THE INVENTION

1. Field of the Invention

The present invention relates generally to a fluid-filled active vibration damping device having a pressure-receiving chamber filled with a non-compressible fluid and capable of actively offsetting or attenuating a vibrational load applied to the pressure-receiving chamber by suitably controlling a pressure of the fluid filling the pressure-receiving chamber. More particularly, the present invention is concerned with such a fluid-filled active vibration damping device that is suitably applicable to active elastic mounts or active dampers or oscillators for use in automotive vehicles.

2. Description of the Related Art

Vibration damping devices have been used for damping or isolating vibrations (including noises induced by the vibrations) of a subject member such as a body of an automotive vehicle or other members suffering from these vibrations or noises. Known examples of such vibration damping devices include: a vibration-damping coupling or mount, e.g., an engine mount, which is interposed between the subject member and a vibration source, e.g., a power unit, so as to connect these two members in a vibration damping or isolating fashion for eliminating or reducing a vibration transmitted from the vibration source to the subject member; and a vibration damper that is fixed to the subject member for attenuating or absorbing the vibration of the subject member.

A fluid-filled active vibration damping device has been proposed as one type of such vibration damping devices, which includes: an elastic body elastically deformed due to vibrational loads applied thereto; a pressure-receiving chamber partially defined by the elastic body and filled with a non-compressible fluid; an oscillating rubber plate disposed elastically displaceable; an oscillating fluid chamber partially defined by one of opposite sides of the oscillating rubber plate and filled with the non-compressible fluid; an orifice passage permitting a fluid communication between the pressure-receiving chamber and the oscillating fluid chamber; and a working air chamber partially defined by the other side of the oscillating rubber plate so as to be opposed to the oscillating fluid chamber with the oscillating rubber plate interposed therebetween. In the known fluid-filled active vibration damping device, an air pressure variation corresponding to vibrations to be damped is applied from the external area to the working air chamber so as to oscillate the oscillating rubber plate, and an oscillating force generated by the oscillation of the oscillating rubber plate is transmitted to the pressure-receiving chamber through the oscillating fluid chamber and the orifice passage, thus making it possible to actively control a fluid pressure variation induced in the pressure-receiving chamber. Thus, the known fluid-filled active vibration damping device is capable of exhibiting an active vibration damping effect or an offsetting effect with respect to vibrations to be damped, and accordingly ensuring high vibration damping characteristics in comparison with conventional passive vibration damping devices. For this reason, the known fluid-filled active vibration damping device has been applied to an engine mount for automotive vehicles where a demand for higher grade damping has been growing.

In order to induce in the working air chamber the air pressure variation having a frequency corresponding to that of the vibrations to be damped, the known fluid-filled active vibration damping device generally employs: an air conduit connectable to the working air chamber; and a solenoid-operated switch valve operable for alternately connecting and disconnecting the air conduit to and from two different air pressure sources, e.g., a vacuum source and the atmosphere, at a frequency corresponding to that of vibrations to be damped.

However, the conventional fluid-filled active vibration damping device is not able to conform the waveform of the air pressure variation induced in the working air chamber to the waveform of the vibrations to be damped with sufficient accuracy, since the air pressure variation is induced in the working air chamber as a result of the switching operation of the solenoid operated switch valve between the two different air pressure sources, namely the air pressure variation is caused by an "ON/OFF" like operation of the solenoid operated switch valve. Also, undesirable pressure variation is likely to be generated due to compressibility of the air used as a pressure-transmitting medium. For the above reasons, the air pressure variation applied to the working air chamber is likely to include secondary frequency components other than a primary frequency component corresponding to the frequency of the vibrations to be damped, thereby undesirably transmitting to the pressure-receiving chamber the oscillating force having the secondary frequency components, which are not corresponding to the frequency of the vibrations to be damped. Therefore, the conventional fluid-filled active vibration damping device may possibly suffer from deterioration of its damping capability due to the generation of the secondary frequency components in the air pressure variation applied to the working air chamber.

SUMMARY OF THE INVENTION

It is therefore one object of this invention to provide a fluid-filled active vibration damping device, which is novel in construction and which is capable of reducing a transmission of a fluid pressure variation having higher frequency components or other frequency components that do not correspond to a vibration to be damped to a pressure-receiving chamber, for thereby exhibiting a desired active vibration damping effect in an effective and a stable manner.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

The present inventors have conducted an extensive study and a multiplicity of experiments in an effort to solve the conventionally experienced problem or to explore a mechanism of generation of the fluid pressure variation having the higher frequency components in the pressure-receiving chamber. As a result, the present inventors discovered at first that the air pressure variation applied to the working air chamber is converted into the fluid pressure variation generated in the oscillating fluid chamber, and then is transmitted to the pressure-receiving chamber through the orifice passage while being influenced by shapes of the orifice passages in terms of pressure transmission characteristics including pressure transmission efficiency. Namely, the pressure transmission characteristics of the orifice passage may vary depending upon its shape. The present invention was developed as a result of a further extensive study on this finding.

(1) A fluid-filled active vibration damping device including: (a) an elastic body elastically deformed due to a vibrational load applied thereto; (b) a pressure-receiving chamber partially defined by the elastic body and filled with a non-compressible fluid; (c) an oscillating rubber plate disposed elastically displaceable; (d) an oscillating fluid chamber partially defined by the oscillating rubber plate, disposed on one of opposite sides of the oscillating rubber plate, and filled with the non-compressible fluid; (e) a first orifice passage for permitting a fluid communication between the pressure-receiving chamber and the oscillating fluid chamber; and (f) a working air chamber partially defined by the oscillating rubber plate and disposed on an other one of opposite sides of the oscillating rubber plate; wherein an air pressure variation having a frequency corresponding to that of a vibration to be damped is applied from an external area to the working air chamber so as to cause an oscillation of the oscillating rubber plate for actively controlling a pressure of the fluid in the pressure-receiving chamber via the oscillating fluid chamber and the first orifice passage, and wherein a ratio V/Q of a passage volume V of the first orifice passage to a unit flow amount Q of the fluid through the first orifice passage caused by the oscillation of the oscillating rubber plate based on the air pressure variation applied to the working air chamber is held within a range from 1 to 10.

In the field of fluid-filled active vibration damping devices to which the present invention is related, conventionally, a first orifice passage for permitting a fluid communication between a pressure-receiving chamber and an oscillating fluid chamber was suitably tuned depending upon a frequency of a vibration to be damped, in order to improve efficiency in transmitting a fluid pressure variation induced in the oscillating fluid chamber to the pressure-receiving chamber. More specifically, a known tuning of the orifice passage includes that a ratio A/L of a cross sectional area A of the orifice passage to a length L thereof is adjusted depending upon the frequency of the vibration to be damped. In the present mode of the invention, on the other hand, the shape of the first orifice passage is determined in view of the above-described unknown novel technical finding that the pressure transmission characteristics of the first orifice passage for the higher frequency components of the fluid pressure induced in the oscillating fluid chamber have a highly dependence on the shape of the first orifice passage. More specifically, the ratio V/Q of the passage volume V of the first orifice passage to the unit amount Q of flow of the fluid through the first orifice passage is held within a range of about 1–10. This arrangement permits the first orifice passage to exhibit an excellent filtering effect for preventing or minimizing undesirable transmission of the secondary frequency components of the frequency of the vibration to be damped from the oscillating fluid chamber to the pressure-receiving chamber. Accordingly, even if the air pressure variation applied to the working air chamber contains the higher frequency components which do not correspond to the frequency of the vibration to be damped, the first orifice passage can prevent or minimize the undesirable transmission of the higher frequency components to the pressure-receiving chamber. Thus, the engine mount of this mode of the invention can effectively exhibit a desired vibration damping or isolating effect with high stability while preventing deterioration of the vibration damping effect due to the undesirable transmission of the higher frequency components to the pressure-receiving chamber.

If the ratio V/Q is not larger than 1, it become difficult for the first orifice passage to sufficiently restrict the transmission of the secondary frequency components to the pressure-receiving chamber. If the ratio V/Q is not smaller than 10, the first orifice passage and the vibration damping device become large too much, so that it is improper for a practical use. It should be appreciated that the unit flow amount Q is interpreted to mean an amount of flow of the fluid through the first orifice passage when the oscillating rubber plate is displaced from the working air chamber side to the oscillating fluid chamber side.

(2) A fluid-filled active vibration damping device according to the above-indicated mode (1) of the invention, wherein the first orifice passage is tuned to a frequency range of the vibration to be damped, which is not less than 30 Hz. In a vibration damping device for use in an automotive vehicle, for example, the frequency range of not less than 30 Hz is recognized as a high frequency range corresponding to booming noises or the like. The orifice passage tuned to this high frequency range tends to have a relatively small length as a result of the above-described known tuning in an attempt to improve the transmission efficiency of the fluid pressure variation through the orifice passage. Therefore, the secondary higher frequency components of the fluid pressure variation induced in the oscillating fluid chamber as a result of the air pressure variation applied to the working air chamber are transmitted through the orifice passage to the pressure-receiving chamber at a high transmission rate, possibly resulting in considerable deterioration of the vibration damping capability of the vibration damping device. On the other hand, the fluid-filled active vibration damping device of this mode of the invention employs the first orifice passage specifically configured as defined in the above-indicated mode (1) of the invention. This first orifice passage permits a high transmission efficiency thereof for transmitting the fluid pressure variation from the oscillating fluid chamber to the pressure-receiving chamber with the help of resonance of the fluid flowing therethrough, while exhibiting the filtering effect with respect to the fluid pressure variation over the high frequency range, for thereby restricting or minimizing the transmission of the higher frequency components of the fluid pressure variation from the oscillating fluid chamber to the pressure-receiving chamber. Thus, the fluid-filled active vibration damping device of this mode of the invention can exhibit an active vibration damping or isolating effect with respect to vibrations over the higher frequency range of not lower than 30 Hz.

(3) A fluid-filled active vibration damping device according to the above-indicated mode (1) or (2), further comprising a partition member disposed on the one of opposite sides of the oscillating rubber plate with a spacing therebetween and separating the pressure-receiving chamber and the oscillating fluid chamber from each other, wherein the first orifice passage extends along a surface of the partition member. This mode of the invention makes it possible to provide a sufficient length of the first orifice passage by effectively utilizing a limited space, thereby assuring a high degree of freedom in designing the first orifice passage.

(4) A fluid-filled active vibration damping device according to any one of the above-indicated modes (1)–(3), further comprising an air pressure controller operable to alternately connect the working air chamber to a vacuum source and an atmosphere at a predetermined frequency corresponding to the frequency of the vibration to be damped, for alternately applying a negative pressure and an atmospheric pressure to the working air chamber. This mode of the invention makes it possible to employ the atmosphere as one of air pressure sources for use in application of the air pressure variation to the working air chamber, thus simplifying the structure of the fluid-filled active vibration damping device.

(5) A fluid-filled active vibration damping device according to any one of the above-indicated modes (1)–(4), wherein the device is adapted to be interposed between two members for elastically connecting the two members in a vibration damping fashion, and further comprises: a first mounting member attachable to one of the two members; a second mounting member attachable to an other one of the two members and opposed to the first mounting member with a spacing therebetween, the first and second mounting members being elastically connected with each other by the elastic body interposed therebetween; an equilibrium chamber partially defined by a flexible layer and filled with the non-compressible fluid; and a second orifice passage for permitting a fluid communication between the equilibrium chamber and the pressure-receiving chamber. This mode of the invention is able to effectively provide fluid-filled active vibration damping couplings (bushings) or mounts used for automotive vehicles, such as an engine mount, a body mount, a member mount and a suspension bushing. In particular, the fluid-filled active vibration damping device includes the equilibrium chamber whose volume is easily variable. This makes it possible to absorb or reduce an increase in the fluid pressure in the pressure-receiving chamber and the oscillating fluid chamber due to the elastic deformation of the elastic body owing to a pressure absorbing effect of the equilibrium chamber when a static load is applied to the device, e.g., when a weight of a power unit is applied to an engine mount for an automotive vehicle. Thus, the fluid-filled active vibration damping device of this mode of the invention can exhibit an intended vibration damping or isolating effect with high stability.

(6) A fluid-filled active vibration damping device according to any one of the above-indicated mode (5), further comprising: a third orifice passage for permitting a fluid communication between the pressure-receiving chamber and the equilibrium chamber, that is disposed in a parallel relationship with the second orifice passage, and that is tuned to a frequency range higher than that of the second orifice passage; and a shut-off valve operable for permitting and inhibiting a fluid communication through the third orifice passage while permitting a fluid communication through the second orifice passage. According to this mode of the invention, the fluid-filled active vibration damping device is able to exhibit a vibration damping or isolating effect based on flow of the fluid through the second orifice passage, with the third orifice passage closed by means of the shut-off valve. Also, the fluid-filled active vibration damping device is able to exhibit a vibration damping or isolating effect with respect to vibrations over the frequency range higher than the frequency range to which the second orifice passage is tuned, based on flows of the fluid through the third orifice passage, with the third orifice passage open by means of the shut-off valve. That is, the fluid-filled active vibration damping device of this mode of the invention is capable of alternatively exhibiting passive vibration damping and/or isolating effects based on flows of the fluid through the second orifice passage and the third orifice passage, by alternatively inhibiting and permitting the fluid communication through the third orifice passage. In addition, the oscillating rubber plate is suitably oscillated so that the fluid-filled active vibration damping device can exhibit a desired active vibration damping or isolating effect, effectively. By effectively utilizing these passive and active vibration damping or isolating effects, the fluid-filled active-vibration damping device is able to selectively exhibit the vibration damping and/or isolating effects with respect to vibrations over three different frequency ranges, with a simple structure. Alternatively, the fluid-filled active-vibration damping device is able to simultaneously exhibit vibration damping or isolating effect with respect to vibrations over a plurality of different frequency ranges.

In the fluid-filled active vibration damping device according to the mode (6) of the invention, the oscillating rubber plate may be oscillated at a frequency corresponding to a high frequency range of the vibration to be damped to which the first orifice passage is tuned, by applying a desirable air pressure variation applied to the working air chamber. Also, the oscillating rubber plate may be oscillated at the frequency to which the second or the third orifice passage is tuned, by applying a desirable air pressure variation applied to the working air chamber, for thereby improving the passive vibration damping or isolating effects with respect to vibrations over the frequency ranges to which the second and third orifice passages are tuned.

(7) A fluid-filled active vibration damping device according to the above-indicated mode (6), wherein an opening of the third orifice passage to the equilibrium chamber is located at a position different from a position of an opening of the second orifice passage to the equilibrium chamber, and the shut-off valve comprises a pneumatically operated actuator disposed so as to be opposed to the opening of the third orifice passage with the flexible layer interposed therebetween, the pneumatically operated actuator being operable to move the flexible layer toward and away from the opening of the third orifice passage for closing and opening the opening of the third orifice passage, in order to permit and inhibit the fluid communication through the third orifice passage. According to this mode of the invention, a driving device of the shut-off valve can be provided by the pneumatically operated actuator, which is simple in construction and light in weight. The use of the actuator further simplifies the structure of the fluid-filled active vibration damping device of this mode of the invention.

(8) A fluid-filled active vibration damping device according to the above-indicated mode (6) or (7), wherein the device is applied to an engine mount for use in automotive vehicles, and the first orifice passage is tuned to a frequency range corresponding to booming noises, the second orifice passage is tuned to a frequency range corresponding to engine shakes, and the third orifice passage is tuned to a frequency range corresponding to engine idling vibrations. According to this mode of the invention, the engine mount is capable of exhibiting passive vibration isolating and damping effects based on resonance or flows of the fluid through the third and second orifice passages with respect to the engine idling vibrations and the engine shakes, which are likely to be excited in an idling condition and a running condition of the vehicle, respectively. With respect to the booming noises or other high frequency vibrations, which are likely to be excited in the running condition of the vehicle, the engine mount can also exhibit an active vibration isolating effect by actively controlling the fluid pressure in the pressure-receiving chamber based on the air pressure variation applied to the working air chamber. In particular, the transmission of the higher frequency components of the air pressure variation applied to the working air chamber can effectively eliminated or reduced owing to the filtering effect of the first orifice passage, thus eliminating the problem of deterioration of the vibration damping capability of the engine mount due to the undesirable transmission of the high frequency components to the pressure-receiving chamber. Thus, the fluid-filled active vibration damping device is capable of exhibiting an excellent vibration damping or isolating effect with respect to vibrations over a wide frequency range with high stability.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
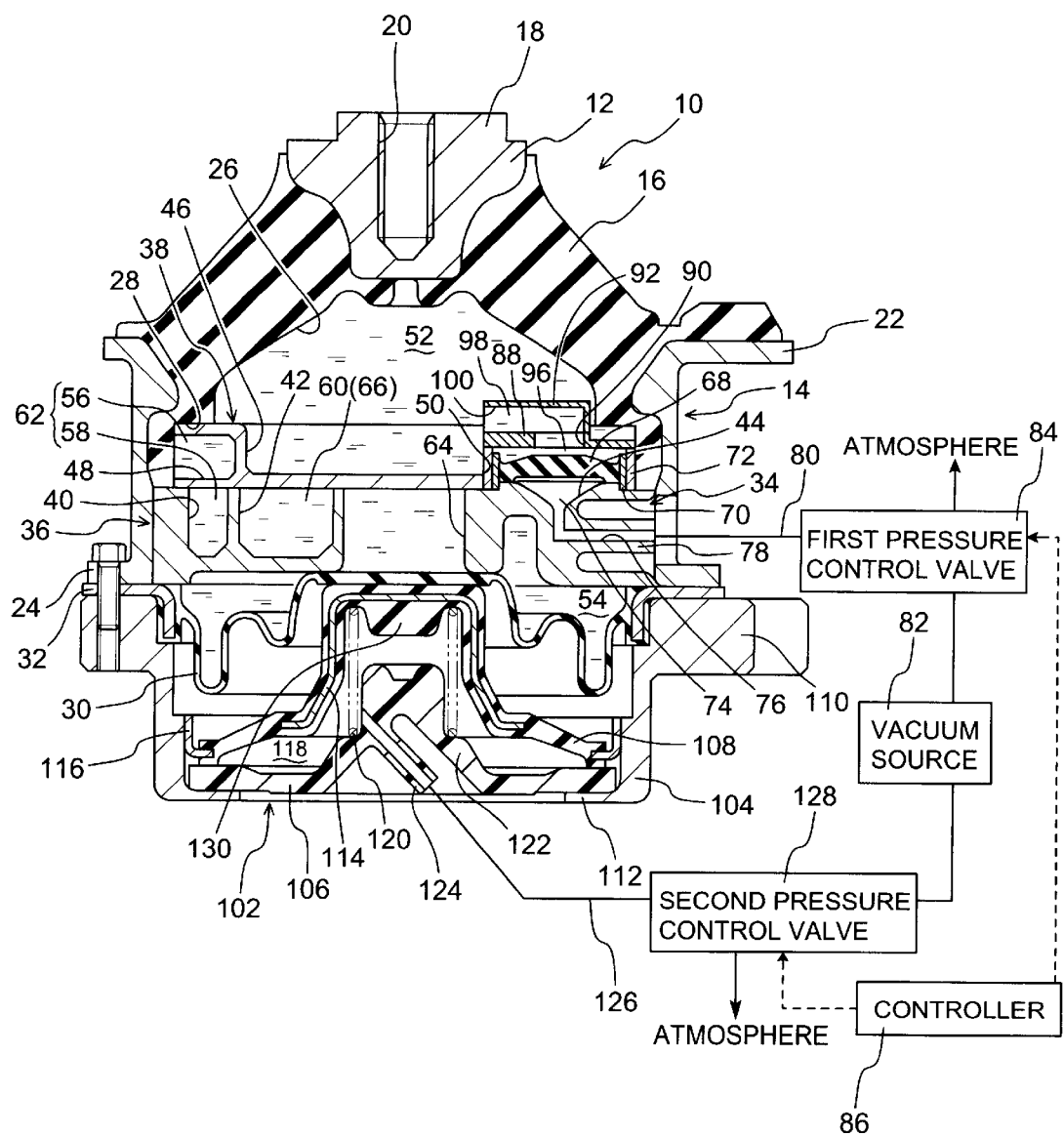
FIG. 1 is an elevational view in axial or vertical cross section of a fluid-filled active vibration damping device in the form of an engine mount constructed according to a first embodiment.

Referring first to FIG. 1, there is shown a fluid-filled active vibration damping device in the form of an engine mount 10 for use in an automotive vehicle, which is constructed according to a first embodiment of the invention. The engine mount 10 includes a first mounting member 12 and a second mounting member 14 which are both made of metal and are mutually spaced and are elastically connected with each other via an elastic body 16 interposed therebetween. The engine mount 10 can be installed on the vehicle such that the first mounting member 12 is fixed to a power unit and the second mounting member 14 is fixed to a body of the vehicle for thereby elastically supporting the power unit on the body of the vehicle in a vibration damping or isolating fashion. The vertical direction in the following description is basically oriented to the vertical direction as seen in FIG. 1.

The first mounting member 12 has a generally inverted frusto-conical shape in its entirety, and includes a positioning projection 18 integrally formed at a central portion of its large diameter end face so as to protrude axially outwardly or upwardly as seen in FIG. 1. A tapped hole 20 is formed in the first mounting member 12 so as to protrude axially and be open in a protruding end face of the positioning projection 18. The first mounting member 12 is fixed to the power unit (not shown) by means of a bolt screwed into the tapped hole 20.

The second mounting member 14 has a large-diameter hollow cylindrical shape in its entirety, and includes an annular upper flange portion 22 and an annular lower flange portion 24 which are integrally formed at its axially upper and lower end portions so as to extend radially outwardly. On the upper side of the second mounting member 14, the first mounting member 12 is disposed so as to be opposed to an upper opening of the second mounting member 14 with a given axial spacing therebetween. These first and second mounting members 12, 14 are elastically connected by the elastic body 16 interposed therebetween.

The elastic body 16 has a generally frusto-conical shape in its entirety, and has a large-diameter recess 26 open in a central portion of its large diameter end face. The elastic body 16 is bonded to the first and second mounting members 12, 14 in a process of vulcanization of a rubber material for forming the elastic body 16, such that the first mounting member 12 is partially embedded within a small diameter end portion of the elastic body 16, while an inner circumferential surface of the upper end portion of the second mounting member 14 is bonded to an outer circumferential surface of the large diameter end portion of the elastic body 16. Thus, the upper opening of the second mounting member 14 is fluid-tightly closed by the elastic body 16. An annular shoulder 28 is provided in the open-end portion of the recess 26.

A flexible diaphragm 30 as a flexible layer is disposed on the lower side of the second mounting member 14. The flexible diaphragm 30 is a disk-like shaped thin rubber layer with a wave-formed slack provided, and is bonded at its peripheral portion to a generally annular-plate-shaped support member 32 that is made of a metallic material, in the process of vulcanization of a rubber material for forming the flexible diaphragm 30. The flexible diaphragm 30 is fixed to the second mounting member 14 with the support member 32 superposed onto and bolted to the lower flange portion 24 of the second mounting member 14, so that the lower opening of the second mounting member 14 is fluid-tightly closed by the flexible diaphragm 30. In this state, the second mounting member 14 has a sealed area defined therein and interposed between the elastic body 16 and the flexible diaphragm 30.

The sealed area interposed between the elastic body 16 and the flexible diaphragm 30 houses an orifice member 34. The orifice member 34 is made of a rigid material such as metal or hard synthetic resin materials, and includes an orifice body 36 and an orifice lid 38. The orifice body 36 has a thick disk-like shape in its entirety and includes a circumferential groove 40 formed at its outer circumferential portion, which extends circumferentially with a given circumferential length and with a generally constant cross sectional shape, and which is open in an upper surface of the orifice body 36. The orifice body 36 further includes a spiral groove 42 disposed radially inward of the circumferential groove 40 while extending spirally with a given length and with a generally constant cross sectional shape. The spiral groove 42 is also open in the upper surface of the orifice body 36. The orifice body 36 also includes a recess 44 formed at a portion where these grooves 40, 42 are not formed, and open in its upper surface.

The orifice lid 38 has a thin disk-like shape in its entirety, and includes a central recess 46 formed at its central portion and open in its upper surface with a generally circular shape in radial cross section. The orifice lid 38 also includes an outer circumferential groove 48 formed at its outer circumferential portion so as to open in its outer circumferential surface and extend circumferentially with a given circumferential length and with a generally constant cross sectional shape. A cutout 50 is also formed in the orifice lid 38 at a portion where the outer circumferential groove 48 is not formed. The cutout 50 extends circumferentially with a circumferential length approximately equal to a quarter of the circumference of the orifice lid 38.

These orifice body 36 and orifice lid 38 are inserted into the bore of the second mounting member 14, while being superposed on and concentrically or coaxially located with each other, whereby the orifice member 34 is assembled with the second mounting member 14. Upon assembling the orifice member 34 with the second mounting member 14 as described, the recess 44 formed in the orifice body 36 and the cutout 50 formed in the orifice lid 38 are positioned with each other so that the recess 44 is open in the upper surface of the orifice member 34 through the cutout 50. This orifice member 34 is sandwiched by and between the elastic body 16 and the support member 32 in an axial direction of the engine mount 10, thereby being firmly fixed to and supported by the second mounting member 14.

With the orifice member 34 housed within the sealed area in the second mounting member 14 as described above, a pressure-receiving chamber 52 partially defined by the elastic body 16 and filled with a non-compressible fluid is formed on the axially upper side of the orifice member 34, and an equilibrium chamber 54 partially defined by the flexible diaphragm 30 and filled with the non-compressible fluid is formed on the axially lower side of the orifice member 34. Upon application of a vibrational load to the engine mount 10, a pressure of the fluid in the pressure-receiving chamber 52 may vary due to an elastic deformation of the elastic body 16, while a volume of the equilibrium chamber 54 may be changed due to an elastic displacement or deformation of the flexible diaphragm 30. The non-compressible fluid filling the pressure-receiving and equilibrium chambers 52, 54 is not particularly limited, and may be selected from among water, alkylene glycol, polyalkylene glycol and silicone oil, for example. The non-compressible fluid preferably has a viscosity of not higher than 0.1 Pa·s for ensuring high vibration damping or isolating effect of the engine mount 10 based on resonance or flows of the fluid, which will be described later.

The orifice lid 38 is fitted into the recess 26 of the elastic body 16 so that the opening of the outer circumferential groove 48 is fluid-tightly closed by an inner surface of the recess 26. Also, the orifice lid 38 fluid-tightly closes the openings of the circumferential groove 40 and the spiral groove 42 both formed in the orifice body 36. In this state, an upper fluid passage 56 is formed at the outer circumferential portion of the orifice lid 38 so as to extend circumferentially with a generally constant cross sectional shape, and a lower fluid passage 58 is formed at the outer circumferential portion of the orifice body 36 so as to extend circumferentially with a generally constant cross sectional shape, while an inner fluid passage 60 is formed in the central portion of the orifice body 36 so as to extend spirally with a generally constant cross sectional shape. One of opposite ends of the upper fluid passage 56 is held in fluid communication with one of opposite ends of the lower fluid passage 58 through a communication hole (not shown) formed through the orifice lid 38. The other ends of the upper and lower fluid passages 56, 58 are open to the pressure-receiving chamber 52 and the equilibrium chamber 54 through a communication hole (not shown), respectively. Thus, the upper and lower fluid passages 56, 58 cooperate to each other to form a second orifice passage in the form of a lower-frequency orifice passage 62 for permitting a fluid communication between the pressure-receiving chamber 52 and the equilibrium chamber 54. On the other hand, one of opposite ends of the inner fluid passage 60 is held in fluid communication with the pressure-receiving chamber 52 through a communication hole (not shown) formed in a bottom wall portion of the central recess 46 of the orifice lid 38, while the other end of the inner fluid passage 60 is held in fluid communication with the equilibrium chamber 54 through a communication hole 64 formed through the orifice body 36, thereby providing a third orifice passage in the form of a medium-frequency orifice passage 66 for permitting the fluid communication between the pressure-receiving chamber 52 and- the equilibrium chamber 54. In the present embodiment, the lower-frequency orifice passage 62 is tuned so that the engine mount 10 can exhibit a high damping effect with respect to engine shakes based on resonance or flows of the fluid through the lower-frequency orifice passage 62, while the medium-frequency orifice passage 66 is tuned so that the engine mount 10 can exhibit a high vibration isolating effect with respect to engine idling vibrations based on resonance or flows of the fluid through the medium-frequency orifice passage 66.

An oscillating rubber plate 68 is disposed axially upward of the recess 44 formed in the orifice body 36. The oscillating rubber plate 68 is a disk-shaped member with a slight convex in cross section, and has a thickness larger at least than that of the flexible diaphragm 30. The thickness of the oscillating rubber plate 68 may be determined so that the oscillating rubber plate 68 can be promptly restored by its elasticity to its original position with high stability, after being released from an external force applied thereto. The oscillating rubber plate 68 is bonded at its peripheral portion to a metallic ring member 70 in the process of vulcanization of a rubber material for forming the oscillating rubber plate 68. On the other hand, a metallic fixing ring 72 is firmly fixed to the orifice body 36 so as to surround an opening of the recess 44 by means of adhesion or welding. The ring member 70 is press-fitted into the fixing ring 72 so that the oscillating rubber plate 68 fluid-tightly closes the opening of the recess 44. In this state, the oscillating rubber plate 68 and the recess 44 cooperate to form a working air chamber in the form of a first working air chamber 74. The first working air chamber 74 is exposed to the atmosphere through a first air passage 76 formed through the orifice member 34. This first air passage 76 is open in an outer circumferential surface of the orifice member 34 via a first port 78. The first port 78 can be connected with a first air conduit 80 so that the first working air chamber 74 can be connected to the atmosphere and a vacuum source 82 through the first air conduit 80. Described in detail, a first pressure control valve 84 is connected to a portion of the first air conduit 80 that is connected to the first working air chamber 74. This first pressure control valve 84 includes two operating positions, namely an atmospheric position for connecting the first working air chamber 74 to the atmosphere and a vacuum position for connecting the first working air chamber 74 to the vacuum source 82. The first pressure control valve 84 may be switched between the two operating positions for alternatively connecting and disconnecting the first working air chamber 74 to and from the atmosphere and the vacuum source 82. A controller 86 suitably controls this switching operation of the first pressure control valve 84. As is apparent from the above description, the first pressure control valve 84 and the controller 86 cooperate to function as an air pressure controller. The vacuum source 82 may be provided by utilizing a vacuum tank utilizing a negative pressure generated in an air intake system of an internal combustion engine of the vehicle, or alternatively a vacuum pump operated by the internal combustion engine of the vehicle, for example.

Within the sealed area in the second mounting member 14, a partition plate 88 as a partition member is also disposed to be located above the oscillating rubber plate 68. The partition plate 88 is a metallic annular plate member having an opening in the form of a central bore 90, and is concentrically or coaxially superposed on and bonded to the fixing ring 72 by means of adhesion, welding or the like. Thus, the partition plate 88 is disposed on the axially upper side of the oscillating rubber plate 68 with an axial spacing therebetween, and cooperates with the oscillating rubber plate 68 to define therebetween an oscillating fluid chamber 96. In other words, the oscillating fluid chamber 96 is formed on the upper side of the oscillating rubber plate 68, while the first working air chamber 74 is formed on the lower side of the oscillating rubber plate 68. Further, an orifice defining member in the form of a rigid cover member 92 having an inverted rectangular container shape is disposed and bonded at its open-end portion on and to the partition plate 88 so that an upper wall portion of the cover member 92 is located above the partition plate 88, and so that the cover member 92 covers the central bore 90 of the partition plate 88. The cover member 92 and the partition plate 88 cooperate to each other to define therebetween a first orifice passage in the form of a higher-frequency orifice passage 98. The higher-frequency orifice passage 98 extends radially outwardly along an upper surface of the partition plate 88, from a radially inner portion to a radially outer portion of the partition plate 88. One of opposite ends of the higher-frequency orifice passage 98 is held in fluid communication with the pressure-receiving chamber 52 through an opening in the form of a cutout 100 formed in the cover member 92, and the other end of the higher-frequency orifice passage 98 is held in fluid communication with the oscillating fluid chamber 96 through the central bore 90 of the partition plate 88. In the present embodiment, the higher-frequency orifice passage 98 is tuned so that the engine mount 10 can exhibit a high vibration isolating effect with respect to booming noises or the like based on flows of the fluid through the higher-frequency orifice passage 98.

In the engine mount 10 constructed according to the present embodiment, the high-frequency orifice passage 98 is dimensioned such that a ratio V/Q of a passage volume V of the high-frequency orifice passage 98 to a unit flow amount Q of the fluid caused by the oscillation of the oscillating rubber plate 68 due to an air pressure variation applied to the first working air chamber 74 is held within a range of about 1–10. The passage volume V of the high-frequency orifice passage 98 should be interpreted to mean an entire volume of the high-frequency orifice passage 98 connecting between the oscillating fluid chamber 96 and the pressure-receiving chamber 52, and may be calculated by multiplying a cross sectional area by a length of the high-frequency orifice passage 98. The unit flow amount Q of the fluid through the high-frequency orifice passage 98 caused by the oscillation of the oscillating rubber plate 68 may be calculated by multiplying a cross sectional area of the oscillating rubber plate 68 in a direction perpendicular to an axial direction thereof by an amount of displacement of the oscillating rubber plate 68 at a central portion where the amount of displacement of the oscillating rubber plate 68 is maximized. In this respect, the amount of displacement of the central portion of the oscillating rubber plate 68 should be measured as follows: First, the engine mount 10 filled with the non-compressible fluid is installed on the vehicle, and then the first pressure control valve 84 is operated at a frequency to which the high-frequency orifice passage 98 is tuned so that the engine mount 10 exhibits the desired active vibration isolating effect. In this condition, the air pressure in the working air chamber 74 is measured. Then, the obtained air pressure is statically applied to the first working air chamber 74 under the condition where the engine mount 10 is not filled with the non-compressible fluid, and then the amount of displacement of the central portion of the oscillating rubber plate 68 is obtained.

In the engine mount 10, a pneumatically operated actuator 102 is incorporated to be located below the second mounting member 14. The actuator 102 includes a metallic fixing member 104, an outer wall member 106 and a rubber elastic wall 108. The fixing member 104 has a hollow cylindrical shape in its entirety, and includes an annular fixing portion 110 integrally formed at its axially upper end portion so as to protrude radially outwardly, and an annular support portion 112 integrally formed at its axially lower end portion so as to protrude radially inwardly. The rubber elastic wall 108 is a generally annular plate-like member, and is bonded at its inner peripheral portion to an open-end portion of an inverted cup-shaped metallic pushing member 114, and at its outer peripheral portion to a generally cylindrical fixing sleeve 116, in the process of vulcanization of a rubber material for forming the rubber elastic wall 108. The surface of the pushing member 114 is substantially entirely coated by a thin rubber layer integrally formed with the rubber elastic wall 108. The outer wall member 106 is a generally disk-shaped member made of a rigid material including hard synthetic resin materials and metal. The outer wall member 106 is inserted into the bore of the fixing member 104 and is held in abutting contact with the support portion 112. The rubber elastic wall 108 is also inserted into the bore of the fixing member 104 with the fixing sleeve 116 forcibly fitted into a cylindrical wall portion of the fixing member 104, whereby the outer wall member 106 and the rubber elastic wall 108 are both fixedly assembled with the fixing member 104. With these members 106, 108 fixedly assembled with the fixing member 104, the outer wall member 106 and the rubber elastic wall 108 are fluid-tightly pressed onto each other at their outer peripheral portions, and cooperate to define therebetween a second working air chamber 118 that is fluid-tightly sealed from the external area. As shown in FIG. 1, the actuator 102 constructed as described above is incorporated in the engine mount 10 such that the fixing portion 110 of the fixing member 104 is superposed onto and bolted to the lower flange portion 24 of the second mounting member 14 with the support member 32 sandwiched therebetween. With the actuator 102 fixedly incorporated in the engine mount 10 as described above, an upper wall portion of the pushing member 114 is located to be opposed via the flexible diaphragm 30 to the opening of the communication hole 64 functioning as an opening of the medium-frequency orifice passage 66 to the equilibrium chamber 54. Meanwhile, the fixing member 104 is fixed to the body of the vehicle by means of a mounting bolt extending through a bolt hole (not shown) formed through the fixing portion 110 of the fixing member 104. As a result, the second mounting member 14 is fixed to the body of the vehicle via the fixing portion 110 of the fixing member 104.

The second working air chamber 118 houses a biasing means in the form of a coil spring 120 which is disposed between the outer wall member 106 and the pushing member 114. Thus, the pushing member 114 is usually forced in the axially upward direction, i.e., in a direction away from the outer wall member 106, by a biasing force of the coil spring 120.

A generally inverted cup-shaped central protrusion 122 is integrally formed at a central portion of the outer wall member 106 so as to protrude into the second working air chamber 118. The central protrusion 122 is provided with an integrally formed second port 124 protruding outwardly. The second port 124 can be connected with a second air conduit 126 so that the second working air chamber 118 can be connected to the atmosphere and the vacuum source 82 through the second air conduit 126. Described in detail, a second pressure control valve 128 is connected to a portion of the second air conduit 126 that is connected to the second working air chamber 118. This second pressure control valve 128 includes a two operating positions, namely an atmospheric position for connecting the second working air chamber 118 to the atmosphere and a vacuum position for connecting the second working air chamber 118 to the vacuum source 82. The second pressure control valve 128 may be switched between the two operating positions for alternatively connecting and disconnecting the second working air chamber 118 to and from the atmosphere and the vacuum source 82. The controller 86 suitably controls this switching operation of the second pressure control valve 128.

With the second working air chamber 118 exposed to the atmosphere, the pushing member 114 is moved axially upward by the biasing force of the coil spring 120. With the second working air chamber 118 connected to the vacuum source 82, the pushing member 114 is moved axially downward and located adjacent to the outer wall member 106, against the biasing force of the coil spring 120. In this respect, a rubber buffer 130 is formed at the upper wall portion of the pushing member 114 so as to protrude toward an upper wall portion of the central protrusion 122 of the outer wall member 106 which is opposed to the upper wall portion of the pushing member 114, so that an amount of displacement of the pushing member 114 in the axially downward direction is effectively limited, when the pushing member 114 is retracted by the negative pressure applied to the second working air chamber 118.

Accordingly, when the second working air chamber 118 is exposed to the atmosphere, as shown in FIG. 1, the pushing member 114 is forced onto the central portion of the lower surface of the orifice body 36 with the flexible diaphragm 30 compressed in between, based on the biasing force of the coil spring 120. Thus, the central portion of the flexible diaphragm 30 is forcedly held in close contact with an peripheral portion of the opening of the communication hole 64, i.e., the opening of the medium-frequency orifice passage 66 on the side of the equilibrium chamber 54, so that the medium-frequency orifice passage 66 is held in a non-operable or closed condition. When the second working air chamber 118 is connected to the vacuum source 82 to be applied with the negative pressure, the pushing member 114 is moved axially downward against the biasing force of the coil spring 120 so that the pushing member 114 and the flexible diaphragm 30 are spaced away from the orifice body 36 of the orifice member 34. As a result, the opening of the communication hole 64 is held in open, so that the medium-frequency orifice passage 66 is held in fluid communication with the equilibrium chamber 54 and in an operable or open condition. Hence, the flexible diaphragm 30 and the actuator 102 cooperate to provide a shut-off valve, in the present embodiment.

The engine mount 10 constructed as described above can exhibit a desired vibration damping or isolating effect when the first and second pressure control valves 84, 128 are suitably operated under control of the controller 86, e.g., according to the following manner. When the vehicle is in an engine idling condition, the second pressure control valve 128 is operated to connect the second working air chamber 118 to the vacuum source 82, whereby the medium-frequency orifice passage 66 becomes operable. In this state, engine-idling vibrations applied to the engine mount 10 cause a fluid pressure variation in the pressure-receiving chamber 52, and a resultant pressure difference between the pressure-receiving chamber 52 and the equilibrium chamber 54 causes flows of the fluid through the medium-frequency orifice passage 66 between the pressure-receiving chamber 52 and the equilibrium chamber 54. Thus, the engine mount 10 can exhibit a vibration-isolating effect with respect to the input engine-idling vibrations based on resonance or flows of the fluid through the medium-frequency orifice passage 66.

When the vehicle is in a running condition, on the other hand, the second pressure control valve 128 is operated to connect the second working air chamber 118 to the atmosphere, whereby the medium-frequency orifice passage 66 becomes inoperable, while the first pressure control valve 84 is operated to be switched between its two operating positions at a frequency and a phase corresponding to those of booming noises to be damped. In this state, engine shakes or other low frequency vibrations applied to the engine mount 10 cause the fluid pressure variation in the pressure-receiving chamber 52, and a resultant pressure difference between the pressure-receiving chamber 52 and the equilibrium chamber 54 causes flows of the fluid through the low-frequency orifice passage 62 between the pressure-receiving chamber 52 and the equilibrium chamber 54. Thus, the engine mount 10 can exhibit a high damping effect with respect to the input engine shakes or other low frequency vibrations based on resonance or flows of the fluid through the low-frequency orifice passage 62.

In addition, the first working air chamber 74 is alternately connected to the atmosphere and the vacuum source 82, as a result of the switching operation of the first pressure control valve 84 as described above, so that the air pressure variation whose frequency and phase correspond to those of the booming noises, is induced in the first working air chamber 74. As a result, the oscillating rubber plate 68 is oscillated to actively cause the fluid pressure variation in the oscillating fluid chamber 96. The actively generated fluid pressure variation in the oscillating fluid chamber 96 is transmitted through the high-frequency orifice passage 98 to the pressure-receiving chamber 52, so that the engine mount 10 can exhibit an active vibration isolating effect with respect to the booming noises as a result of the active fluid pressure control of the pressure-receiving chamber 52.

It should be appreciated that the high-frequency orifice passage 98 is dimensioned such that the ratio V/Q of the passage volume V of the high-frequency orifice passage 98 to the unit flow amount Q of the fluid through the high-frequency orifice passage 98 caused by the oscillation of the oscillating rubber plate 68 due to the air pressure variation applied to the first working air chamber 74, is held within a range of about 1–10. This arrangement allows the high-frequency orifice passage 98 to function like a filter for preventing or reducing undesirable transmission of higher frequency components of a frequency of a vibration to be damped, i.e., a frequency of the booming noise, which may be contained in the air pressure variation induced in the working air chamber 74 by the switching operation of the first pressure control valve 84. Therefore, the engine mount 10 constructed according to the present embodiment is capable of effectively preventing deterioration of its vibration damping or isolating effect due to the undesirable transmission of the higher frequency components as described above.

As is understood from the aforesaid description, the engine mount 10 constructed according to the present invention can exhibit an excellent vibration damping or isolating effect with respect to all of the engine shakes or other low frequency vibrations, the engine idling vibrations or other medium frequency vibrations, and the booming noises or other high frequency vibrations. In particular, when the vehicle is in the running condition, the engine mount 10 can an exhibit excellent vibration damping and isolating effect simultaneously with respect to vibrations of different frequency ranges, namely, the engine shakes or the low frequency vibrations and the booming noises or the high frequency vibrations.

Further, the oscillating rubber plate 68 is arranged to have a given thickness over its entire area so that the oscillating rubber plate 68 can be promptly restored by its elasticity to its original position with high stability, after being released from the external force applied thereto. This elasticity of the rubber plate 68 can exhibit a damping effect with respect to higher frequency components of the frequency of the vibration to be damped, further effectively preventing or minimizing the undesirable transmission of the higher frequency components to the pressure-receiving chamber 52.

In the engine mount 10, the air pressure variation whose frequency and phase correspond to those of the booming noises is applied to the first working air chamber 74 for oscillating the oscillating rubber plate 68. Although this air pressure variation induced in the working air chamber 74 is likely to induce the higher frequency components of the frequency of the vibration to be damped, the above-described filtering effect of the high-frequency orifice passage 98 makes it possible for the engine mount 10 to prevent or minimize deterioration of the vibration damping or isolating capability due to the undesirable transmission of the higher frequency components to the pressure-receiving chamber 52. Thus, the engine mount 10 can exhibit a high active vibration isolating effect with respect to the booming noises based on the oscillation of the oscillating rubber plate 68.

The engine mount 10 constructed as described above was actually operated by oscillating the oscillating rubber plate 68 so as to apply an oscillating force between the first and second mounting members 12, 14. In this state, the engine mount 10 was tested by measuring a magnitude F1 of a secondary component of the oscillating force at a peak frequency and a magnitude F2 of the secondary component of the oscillating force at a frequency 10 Hz higher than the peak frequency, while varying the ratio V/Q. A graph of FIG. 2 demonstrates a relationship between reduction rates F2/F1 of the secondary component of the oscillating force and the ratios V/Q (see black dots).

Figure 2:
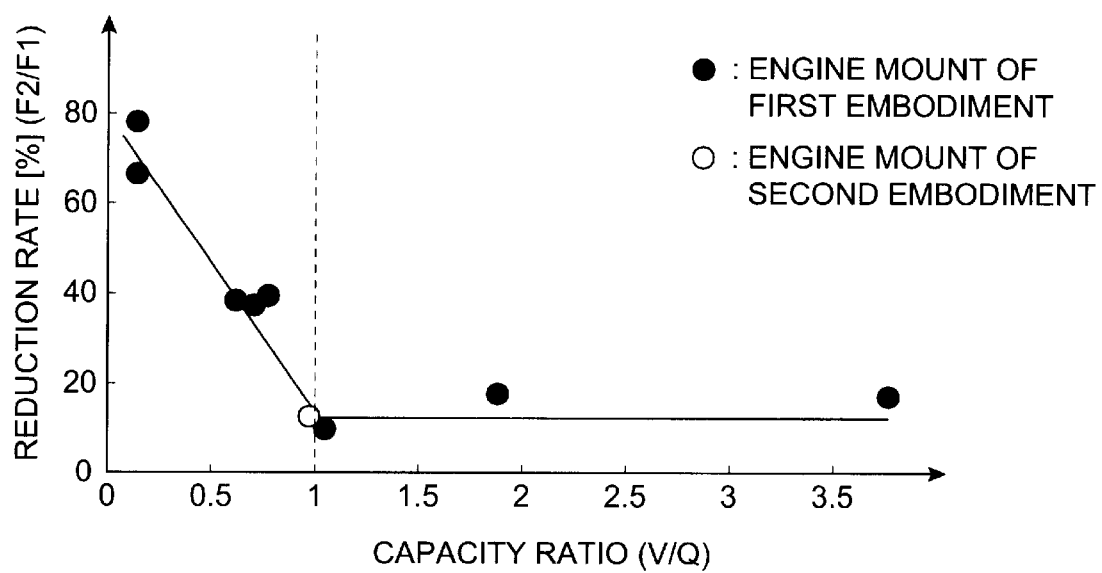
FIG. 2 is a graph showing the relationship between a V/Q value of a high-frequency orifice passage of the engine mount of FIG. 1 and a secondary component of an oscillating force applied between the first and second mounting members upon an oscillation of the oscillating rubber plate.

As is understood from the graph of FIG. 2, the high-frequency orifice passage 98 can exhibit a filtering effect for thereby restricting the generation of the secondary component of the oscillating force applied between the first and second mounting members 12, 14 based on the oscillation of the oscillating rubber plate 68, so long as the ratio V/Q is arranged to be not smaller than 1.

Figure 3:
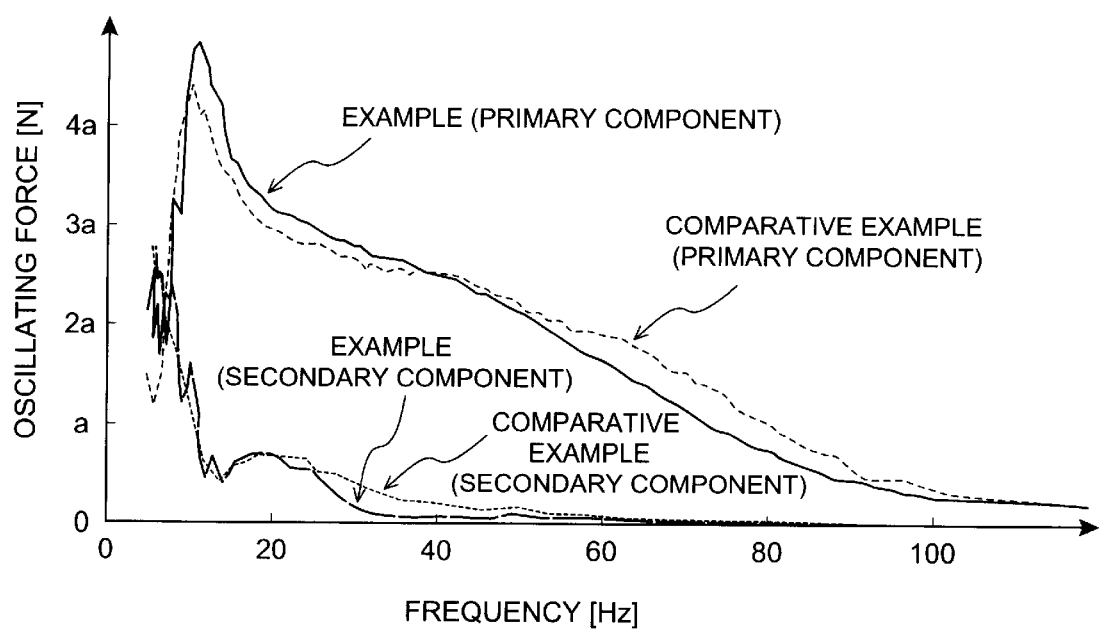
FIG. 3 is a graph showing frequency characteristics of an oscillating force applied between the first and second mounting members upon the oscillation of the oscillating rubber plate measured in the engine mount of FIG. 1, together with those measured in an engine mount according to a comparative example.

An example of the engine mount 10 was produced by setting the ratio V/Q to 1.0. The example of the engine mount 10 was tested by measuring a relationship between a frequency of the oscillation of the oscillating rubber plate 68 and a primary and a secondary component of the oscillating force applied between the first and second mounting members 12, 14 based on the oscillation of the oscillating rubber plate 68. The result of measurements is shown in the graph of FIG. 3. The same measurement was conducted on a comparative example of the engine mount, which was produced to be identical in construction with the engine mount 10, except that the ratio V/Q is set to 0.7. The result is also indicated in FIG. 3.

As is apparent from the results of the measurements indicated in the graph of FIG. 3, the example of the engine mount 10 with the ratio V/Q of 1, can substantially eliminate the secondary component of the oscillating force when the oscillating frequency of the oscillating rubber plate 68 is higher by 20 Hz or more than the peak frequency of the secondary component of the oscillating force, whereas the comparative example of the engine mount with the ratio V/Q of 0.7 cannot substantially eliminate the secondary component of the oscillating force until the oscillating frequency of the oscillating rubber plate 68 exceeds a frequency level still higher than the frequency level 20 Hz higher than the peak frequency of the secondary component of the oscillating force. Thus, the engine mount 10 of the present embodiment is capable of eliminating or reducing the secondary component of the oscillating force at a frequency range corresponding to booming noises, thereby effectively eliminating the problem of the deterioration of the damping capability for the frequency range corresponding to the booming noises.

Figure 4:
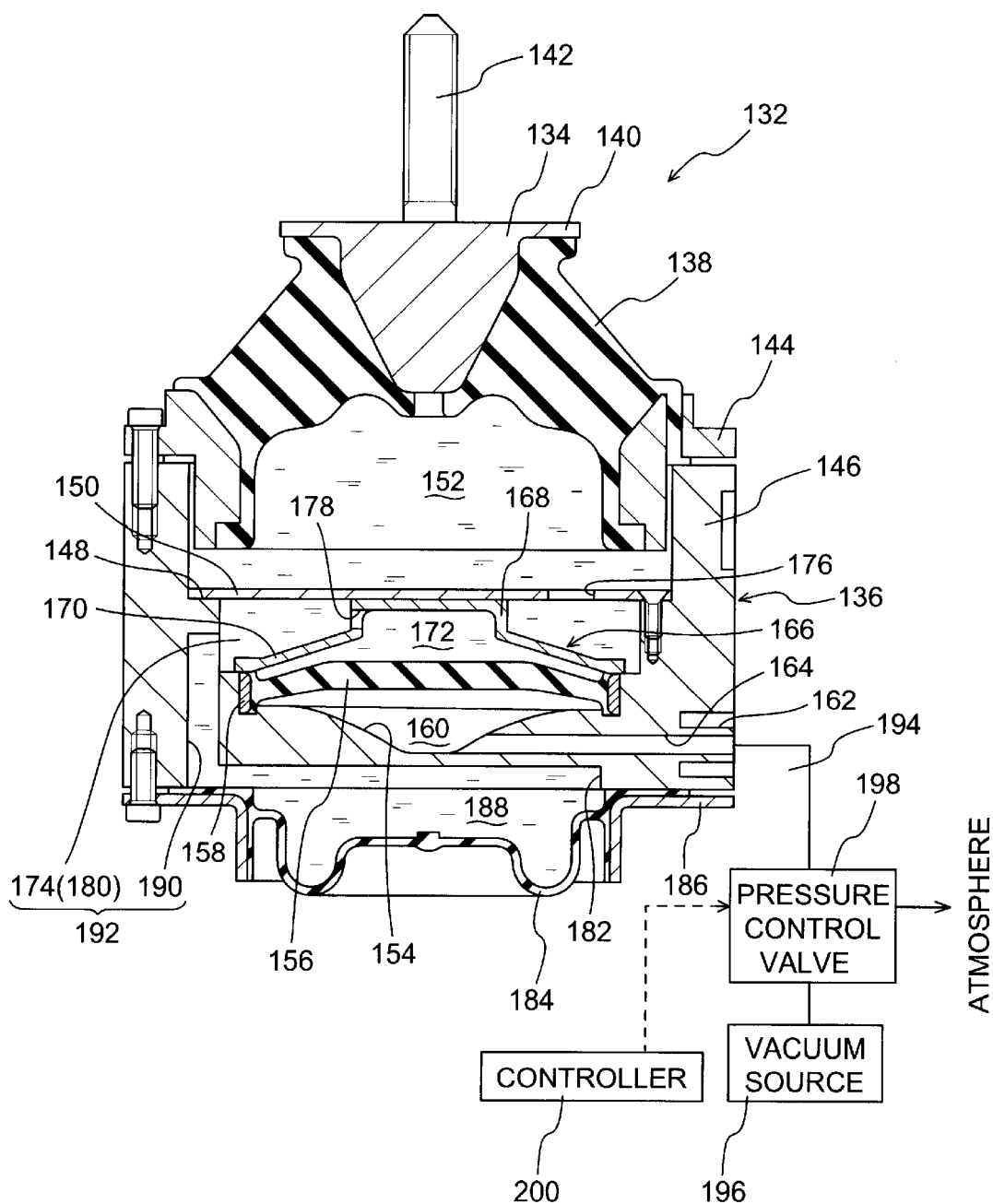
FIG. 4 is an elevational view in axial or vertical cross section of a fluid-filled active vibration damping device in the form of an engine mount constructed according to a second embodiment.

Referring next to FIG. 4, there is shown an engine mount 132 constructed according to a second embodiment of the fluid-filled active vibration damping device of the present invention. The engine mount 132 includes first mounting member 134 and a second mounting member 136 which are both made of metal and are mutually spaced and are elastically connected with each other via an elastic body 138 interposed therebetween. The engine mount 132 can be installed on the vehicle such that the first mounting member 134 is fixed to the power unit and the second mounting member 136 is fixed to the body of the vehicle for thereby elastically supporting the power unit on the body of the vehicle in a vibration damping or isolating fashion. The vertical direction in the following description is basically oriented to the vertical direction as seen in FIG. 4.

Described more specifically, the first mounting member 134 has a generally inverted frusto-conical shape in its entirety, and includes a flange portion 140 integrally formed at its large diameter end portion so as to extend radially outwardly. A mounting bolt 142 is also integrally formed at the large diameter end portion of the first mounting member 134 so as to protrude axially upwardly. Thus, the first mounting member 134 is fixed to the power unit side by means of the mounting bolt 142.

The elastic body 138 has a large-diameter generally frusto-conical shape in its entirety, and is bonded to the first mounting member 134 in a process of vulcanization of a rubber material for forming the elastic body 138, such that the first mounting member 134 is partially embedded within a small diameter end portion of the elastic body 138. A metallic connecting sleeve 144 with an annular block shape is bonded to an outer circumferential surface of a large diameter end portion of the elastic body 138 in the above-described vulcanization process. The second mounting member 136 is bolted to the metallic connecting sleeve 144.

The second mounting member 136 has a generally cylindrical cup shape in its entirety. The connecting sleeve 144 is fluid-tightly superposed on and fixed to an open end face of a cylindrical wall portion 146 of the second mounting member 136, whereby the opening of the second mounting member 136 is fluid-tightly closed by the elastic body 138, while the first and second mounting members 134, 136 are elastically connected with each other by the elastic body 138. The cylindrical wall portion 146 of the second mounting member 136 includes an annular shoulder surface 148 integrally formed at an axially intermediate portion of an inner circumferential surface thereof so as to extend circumferentially for supporting a partition member in the form of a partition plate 150. This partition plate 150 is superposed on and bolted to the shoulder surface 148 so as to extend in a radial direction perpendicular to an axial direction of the second mounting member 136, for thereby fluid-tightly dividing an interior space of the second mounting member 136 into two regions disposed on the opposite sides thereof.

Namely, the partition plate 150 cooperates with the elastic body 138 to define therebetween a pressure-receiving chamber 152 partially defined by the elastic body 138 and filled with a non-compressible fluid. The non-compressible fluid may be selected from among the low viscosity fluids described above with respect to the first embodiment, preferably.

The second mounting member 136 is provided with a mortar shaped recess 154 open in an upper surface of its bottom wall portion. Further, an oscillating rubber plate 156 is disposed above the recess 154 for closing an opening of the recess 154. This oscillating rubber plate 156 is a disk-shaped member with a slight convex in cross section and has a generally constant thickness over its entire area. The thickness of the oscillating rubber plate 156 may be determined so that the oscillating rubber plate 156 can be promptly restored by its elasticity to its original position with high stability, after being released from the external force applied thereto. The oscillating rubber plate 156 is bonded at its peripheral portion to a metallic fixing ring 158 in the process of vulcanization of a rubber material for forming the oscillating rubber plate 156. The fixing ring 158 is press-fitted into an open-end portion of the recess 154 so that the oscillating rubber plate 156 is disposed in an axially upper portion of the recess 154 so as to extend in the radial direction, in order to fluid-tightly close the opening of the recess 154. In this state, the oscillating rubber plate 156 and the recess 154 cooperate to form a working air chamber 160. The working air chamber 160 is exposed to the atmosphere through an air passage 164 formed through the second mounting member 136. This air passage 164 is open at one of opposite ends thereof in an outer circumferential surface of the second mounting member 136 via a first port 162, and at the other end thereof in a bottom of the recess 154 to be held in communication with the working air chamber 160. A suitable air pressure variation may be applied to the working air chamber 160 through the air passage 164 for oscillating the oscillating rubber plate 156.

Further, an orifice defining member in the form of a metallic orifice member 166 is disposed between the oscillating rubber plate 156 and the partition plate 150. The orifice member 166 has a hut-like shape in its entirety, and includes an inverted cup shaped central portion 168 and a tapered flange shaped annular plate portion 170 that extends radially outwardly from an open-end portion of the central portion 168 while being inclined to the axially downward direction as seen in FIG. 4. The orifice member 166 is held in contact with and bonded to the partition plate 150 at its upper wall of the central portion 168, while being held in fluid-tight contact with the fixing ring 158 at its peripheral portion of the annular plate portion 170. That is, the orifice member 166 and the oscillating rubber plate 156 cooperate to define therebetween an oscillating fluid chamber 172 partially defined by the oscillating rubber plate 156, and opposed to the working air chamber 160 with the oscillating rubber plate 156 interposed therebetween. This oscillating fluid chamber 172 is also filled with the non-compressible fluid, like the pressure-receiving chamber 152.

The orifice member 166 further cooperate with the cylindrical wall portion 146 of the second mounting member 136 to define therebetween a circumferential fluid passage 174 extending circumferentially with a given circumferential length that is slightly smaller than the circumference of the second mounting member 136. The circumferential fluid passage 174 is connected at one of opposite ends thereof to the pressure-receiving chamber 152 through an opening in the form of a communication hole 176 formed through the partition plate 150, and at the other end thereof to the oscillating fluid chamber 172 through an opening in the form of a communication hole 178 formed through the central portion 168 of the orifice member 166. As is understood from the aforesaid description, the circumferential fluid passage 174 serves as a high-frequency orifice passage 180 for permitting a fluid communication between the pressure-receiving chamber 152 and the oscillating fluid chamber 172. Thus, the high-frequency orifice passage 180 is formed to extend circumferentially along a lower surface of the partition plate 150, and is tuned so that the engine mount 132 can exhibit a high vibration isolating effect with respect to engine idling vibrations based on resonance or flows of the fluid through the high-frequency orifice passage 180.

In the engine mount 132 constructed according to the present embodiment, the high-frequency orifice passage 180 is dimensioned such that a ratio V/Q of a passage volume V of the high-frequency orifice passage 180 to a unit amount Q of the fluid through the high-frequency orifice passage 180 caused by the oscillation of the oscillating rubber plate 156 due to the air pressure variation applied to the first working air chamber 160 is held within a range of about 1–10. The passage volume V and the unit amount Q may be calculated according to the same manner as in the first embodiment.

In the bottom wall of the second mounting member 136, a shallow recess 182 is formed to be open in a central portion of a lower surface of the bottom wall. A flexible layer in the form of a thin-disk-shaped flexible diaphragm 184 is disposed on the axially lower side of the second mounting member 136 to which the shallow recess 182 is open. This flexible diaphragm 184 is fixed at its peripheral portion to an annular fixing member 186 made of metal in the process of vulcanization of a rubber material for forming the flexible diaphragm 184. This fixing member 186 is superposed onto and bolted to the bottom surface of the second mounting member 136, so that the peripheral portion of the flexible diaphragm 184 is held in fluid-tight contact with a peripheral end face of the opening of the recess 1 82, whereby the opening of the recess 182 is fluid-tightly closed by the flexible diaphragm 184. In this state, the recess 182 and the flexible diaphragm 184 cooperate to define therebetween an equilibrium chamber 188 partially defined by the flexible diaphragm 184 and whose volume is variable. The equilibrium chamber 188 is also filled with the non-compressible fluid, like the pressure-receiving chamber 152.

The second mounting member 136 is also formed with an axial fluid passage 190 extending between a circumferential portion of the circumferential fluid passage 174 and the equilibrium chamber 188 in the axial direction, and disposed radially outward of the oscillating rubber plate 156. Thus, the equilibrium chamber 188 is held in fluid communication with the pressure-receiving chamber 152 through the axial fluid passage 190 and the circumferential fluid passage 174. In the present embodiment, accordingly, the circumferential and axial fluid passages 174, 190 cooperate to form a second orifice passage in the form of a low-frequency orifice passage 192 for permitting a fluid communication between the pressure-receiving and equilibrium chambers 152, 188. The low-frequency orifice passage 192 is tuned so that the engine mount 132 can exhibit a high vibration damping effect with respect to engine shakes based on resonance or flows of the fluid through the low-frequency orifice passage 192.

The engine mount 132 is installed between the power unit and the body of the vehicle such that the first mounting member 134 is fixed to the power unit side by means of the mounting bolt 142, while the second mounting member 136 is fixed to the body side via a suitable bracket or the like. With the engine mount 132 installed on the vehicle as described above, an external air conduit 194 can be connected to the port 162 so that the working air chamber 160 is alternately connectable to the atmosphere and a vacuum source 196 through the external air conduit 194. Described in detail, a pressure control valve 198 is connected to a portion of the external air conduit 194. This pressure control valve 198 includes two operating positions, namely an atmospheric position for connecting the working air chamber 160 to the atmosphere and a vacuum position for connecting the working air chamber 160 to the vacuum source 196. The pressure control valve 198 may be switched between the two operating positions for alternatively connecting and disconnecting the first working air chamber 160 to and from the atmosphere and the vacuum source 196. A controller 200 suitably controls this switching operation of the pressure control valve 198 so that the engine mount 132 can exhibit a desired active vibration damping or isolating effect based on the switching operation of the pressure control valve 198.

In operation, when the vehicle is in a running condition, for example, the engine mount 132 can exhibit a high vibration damping effect with respect to input low frequency vibrations such as engine shakes, based on resonance or flows of the fluid through the low-frequency orifice passage 192 between the pressure-receiving chamber 152 and the equilibrium chamber 188.

On the other hand, when the vehicle is in an engine idling condition, the pressure control valve 198 is operated to be switched between the two operating positions for alternately connecting and disconnecting the working air chamber 160 to and from the atmosphere and the vacuum source 196. The switching operation of the pressure control valve 198 is controlled by the controller 200 according to a feedback control program or a stored data map prepared in advance, on the basis of a reference signal, e.g., a signal corresponding to an ignition timing of an internal combustion engine so that the air pressure variation applied to the working air chamber 160 has a frequency corresponding to that of the engine idling vibrations to be damped. As a result, the oscillating rubber plate 156 is oscillated based on the air pressure variation applied to the working air chamber 160 at the frequency corresponding to that of the engine idling vibrations, thus actively causing flows of the fluid through the high-frequency orifice passage 180 between the pressure-receiving chamber 152 and the oscillating fluid chamber 172. Therefore, the engine mount 132 can effectively exhibit an active vibration isolating effect with respect to the engine idling vibrations based on resonance or flows of the fluid through the high-frequency orifice passage 180. As is apparent from the aforesaid description, the pressure control valve 198 and the controller 200 cooperate to provide an air pressure controller in the present embodiment.

Like the first embodiment, the ratio V/Q of the passage volume V of the high-frequency orifice passage 180 to the unit flow amount Q of the fluid through the high-frequency orifice passage 180 caused by the oscillation of the oscillating rubber plate 156 is held within a range of about 1–10. Even if the air pressure variation applied to the working air chamber 160 contains higher frequency components of a frequency of the vibration to be damped, the high-frequency orifice passage 180 whose ratio V/Q is arranged as described above is able to prevent or minimize undesirable transmission of the higher frequency components to the pressure-receiving chamber 152. Thus, the engine mount 132 of the present embodiment can effectively prevent the problem of deterioration of its vibration damping capability due to the undesirable transmission of the higher frequency components to the pressure-receiving chamber 152.

The engine mount 132 constructed as described above was actually operated by oscillating the oscillating rubber plate 156 so as to apply an oscillating force between the first and second mounting members 134, 136. In this state, the engine mount 132 was tested by measuring a magnitude F1 of a secondary component of the oscillating force at a peak frequency and a magnitude F2 of the secondary component of the oscillating force at a frequency 10 Hz higher than the peak frequency. A graph of FIG. 2 demonstrates a relationship between a reduction rate F2/F1 of the secondary component of the oscillating force and the ratio V/Q (see a white dot).

As is understood from the graph of FIG. 2, the high-frequency orifice passage 180 can exhibit a filtering effect for thereby restricting the generation of the secondary component of the oscillating force applied between the first and second mounting members 134, 136 based on the oscillation of the oscillating rubber plate 156, since the ratio V/Q is held within a range of about 1–10.

While the presently preferred embodiments of this invention have been described above in detail for the illustrative purpose only, it is to be understood that the present invention is not limited to the details of the illustrated embodiments, but may be otherwise embodied.

While the illustrated embodiments relate to the engine mounts for use in the automotive vehicles, the principle of the present invention is equally applicable to various other types of mounts such as a body mount and a suspension bushing for use in automotive vehicles, and fluid-filled vibration damping couplings (bushings) or mounts used for various devices other than those for automotive vehicles.

Also, the principle of the present invention is equally applicable to an active vibration damper that is mounted on a subject member whose vibrations to be damped for exhibiting a vibration damping effect. For instance, such an active vibration damper may be provided as follows: The first mounting member 12, 134 is fixed to the subject member, while the second mounting member 14, 136 is freely displaceable relative to the first mounting member 12, 134. The elastic body 16, 138 functioning as a spring component and the second mounting member 14, 136 functioning as a mass component cooperate to provide a secondary vibration system with respect to the subject member as a primary vibration system. Alternatively, the second mounting member 14, 136 is fixed to the subject member, while the first mounting member 12, 134 is freely displaceable relative to the second mounting member 14, 136. The elastic body 16, 138 functioning as a spring component and the first mounting member 12, 134 functioning as a mass component cooperate to provide a secondary vibration system with respect to the subject member as a primary vibration system. In the latter case, where the first mounting member 12, 134 functions as the mass component, the volume of the mass component may be desirably increased by increasing the volume of the first mounting member 12, 134 or alternatively by fixing an additional mass member to the first mounting member 12, 134.

The specific configurations and tuning frequencies of the low-frequency orifice passage 62, the medium-frequency orifice passage 66 and the high-frequency orifice passage 98 of the engine mount 10 of the first embodiment are not particularly limited to the first embodiment. Likewise, the specific configurations and tuning frequencies of the low-frequency orifice passage 192 and the high-frequency orifice passage 180 of the engine mount 132 of the second embodiment are not particularly limited to the second embodiment.

These orifice passages may be provided on the upper side and/or the lower side of the partition member. Further, each orifice passage may have a desired shape that is designed taking into account an installation space, a required length, or the like. For instance, these orifice passages may have a straight shape, a circumferential shape, a spiral shape, a zigzag shape or the like.

In the first and second embodiments, the oscillating rubber plates 68, 156 have a sufficient thickness so that the oscillating rubber plates 68, 156 can be promptly restored to their original positions by their elasticity with high stability, after being released from an external force applied thereto. Alternatively, a combination of a thin oscillating rubber plate and an elastic support member may be employed, in which the oscillating rubber plate has a relatively small thickness over its entire area, and the elastic support member is disposed on one side of the oscillating rubber plate and pushes a central portion of the oscillating rubber plate in one direction so that the thin oscillating rubber plate can be restored fast to its original position by means of a biasing force of the elastic support member, after being released from the external force applied thereto.

It is also to be understood that the present invention may be embodied with various other changes, modifications and improvements, which may occur to those skilled in the art, without departing from the spirit and scope of the invention defined in the following claims.

What is claimed is:

1. A fluid-filled active vibration damping device comprising:
   an elastic body elastically deformed due to a vibrational load applied thereto;
   a pressure-receiving chamber partially defined by said elastic body and filled with a non-compressible fluid;
   an oscillating rubber plate disposed elastically displaceable;
   an oscillating fluid chamber partially defined by said oscillating rubber plate and disposed on one of opposite sides of said oscillating rubber plate, while being filled with said non-compressible fluid;
   a first orifice passage for permitting a fluid communication between said pressure-receiving chamber and said oscillating fluid chamber; and
   a working air chamber partially defined by said oscillating rubber plate and disposed on an other one of opposite sides of said oscillating rubber plate;
   wherein an air pressure variation having a frequency corresponding to that of a vibration to be damped is applied from an external area to said working air chamber so as to cause an oscillation of said oscillating rubber plate for actively controlling a pressure of said fluid in said pressure-receiving chamber via said oscillating fluid chamber and said first orifice passage, and
   wherein a ratio V/Q of a passage volume V of said first orifice passage to a unit flow amount Q of said fluid through said first orifice passage is held within a range of 1–10.

2. A fluid-filled active vibration damping device according to claim 1, wherein said first orifice passage is tuned to a frequency range of said vibration to be damped, which is not less than 30 Hz.

3. A fluid-filled active vibration damping device according to claim 1, further comprising a partition member disposed on said one of opposite sides of said oscillating rubber plate with a spacing therebetween, and dividing said pressure-receiving chamber and said oscillating fluid chamber from each other, said first orifice passage extending along a surface of said partition member.

4. A fluid-filled active vibration damping device according to claim 3, further comprising an orifice defining member disposed on said partition member on a side of said pressure-receiving chamber so as to cooperate with said partition member to define therebetween said first orifice passage such that one of opposite ends of said first orifice passage is held in fluid communication with said oscillating fluid chamber through an opening formed through said partition member and an other one of said opposite ends of said first orifice passage is held in fluid communication with said pressure-receiving chamber through an opening formed through said orifice defining member.

5. A fluid-filled active vibration damping device according to claim 3, further comprising an orifice defining member disposed on said partition member on a side of said oscillating fluid chamber so as to cooperate with said partition member to define therebetween said first orifice passage such that one of opposite ends of said first orifice passage is held in fluid communication with said oscillating fluid chamber through an opening formed through said orifice defining member and an other one of said opposite ends of said first orifice passage is held in fluid communication with said pressure-receiving chamber through an opening formed through said partition member.

6. A fluid-filled active vibration damping device according to claim 1, further comprising an air pressure controller operable to alternately connect said working air chamber to a vacuum source and an atmosphere at a predetermined frequency corresponding to said frequency of said vibration to be damped, for alternately applying a negative pressure and an atmospheric pressure to said working air chamber.

7. A fluid-filled active vibration damping device according to claim 1, wherein said device is adapted to be interposed between two members for elastically connecting the two members in a vibration damping fashion, and further comprises: a first mounting member attachable to one of the two members; a second mounting member attachable to an other one of the two members and opposed to said first mounting member with a spacing therebetween, said first and second mounting members being elastically connected with each other by said elastic body interposed therebetween; an equilibrium chamber partially defined by a flexible layer and filled with said non-compressible fluid; and a second orifice passage for permitting a fluid communication between said equilibrium chamber and said pressure-receiving chamber.

8. A fluid-filled active vibration damping device according to claim 7, further comprising: a third orifice passage for permitting a fluid communication between said pressure-receiving chamber and said equilibrium chamber, that is disposed in a parallel relationship with said second orifice passage, and that is tuned to a frequency range higher than that of said second orifice passage; and a shut-off valve operable for permitting and inhibiting a fluid communication through said third orifice passage while permitting a fluid communication through said second orifice passage.

9. A fluid-filled active vibration damping device according to claim 8, wherein an opening of said third orifice passage to said equilibrium chamber is located at a position different from a position of an opening of said second orifice passage to said equilibrium chamber, and said shut-off valve comprises a pneumatically operated actuator disposed so as to be opposed to said opening of said third orifice passage with said flexible layer interposed therebetween, said pneumatically operated actuator being operable to move said flexible layer toward and away from said opening of said third orifice passage for closing and opening said opening of said third orifice passage, in order to permit and inhibit said fluid communication through said third orifice passage.

10. A fluid-filled active vibration damping device according to claim 8, wherein said device is applied to an engine mount for use in automotive vehicles, and said first orifice passage is tuned to a frequency range corresponding to booming noises, said second orifice passage is tuned to a frequency range corresponding to engine shakes, and said third orifice passage is tuned to a frequency range corresponding to engine idling vibrations.

* * * * *

UNITED STATES PATENT AND TRADEMARK OFFICE
CERTIFICATE OF CORRECTION

PATENT NO. : 6,592,111 B2
APPLICATION NO. : 10/282857
DATED : July 15, 2003
INVENTOR(S) : Nishi et al.

It is certified that error appears in the above-identified patent and that said Letters Patent is hereby corrected as shown below:

On the front page of the patent (73) Assignee:

-- Tokai Rubber Industries, Ltd. (Komaki, JP);
   Honda Giken Kogyo Kabushiki Kaisha, (Tokyo, JP)--

Signed and Sealed this

Eleventh Day of September, 2007

JON W. DUDAS
*Director of the United States Patent and Trademark Office*